US006865861B2

(12) United States Patent
White

(10) Patent No.: US 6,865,861 B2
(45) Date of Patent: Mar. 15, 2005

(54) VERTICALLY ORIENTED LATERAL TRANSFER SYSTEM FOR INTERFOLDED SHEETS

(75) Inventor: Barton J. White, Marinette, WI (US)

(73) Assignee: FPNA Acquisition Corporation, Green Bay, WI (US)

( * ) Notice: Subject to any disclaimer, the term of this patent is extended or adjusted under 35 U.S.C. 154(b) by 0 days.

(21) Appl. No.: 10/610,458

(22) Filed: Jun. 30, 2003

(65) Prior Publication Data

US 2004/0261365 A1 Dec. 30, 2004

(51) Int. Cl.[7] .......................... B65B 63/04; B65B 35/50
(52) U.S. Cl. ............................ 53/429; 53/461; 53/228; 53/541
(58) Field of Search .......................... 53/429, 461, 152, 53/153, 157, 541, 228; 493/356, 357, 359, 360, 420, 430; 198/412, 620, 626.1, 626.3; 270/32, 39.06; 414/795.8, 796.5, 796.7, 796.8

(56) References Cited

U.S. PATENT DOCUMENTS

| | | | |
|---|---|---|---|
| 2,761,676 A | | 9/1956 | Sabee et al. |
| 2,761,677 A | | 9/1956 | Rutkus et al. |
| 3,191,356 A | * | 6/1965 | Zelnick et al. ................ 53/229 |
| 4,163,548 A | | 8/1979 | Nystrand |
| 4,494,741 A | | 1/1985 | Fischer et al. |
| 4,770,402 A | * | 9/1988 | Couturier ..................... 493/357 |
| 4,917,365 A | | 4/1990 | Stemmler et al. |
| 5,005,816 A | | 4/1991 | Stemmler et al. |
| 5,067,698 A | | 11/1991 | Stemmler |
| 5,086,855 A | * | 2/1992 | Tolson ...................... 198/626.1 |
| 5,097,653 A | * | 3/1992 | Soloman ...................... 53/499 |
| 5,189,864 A | * | 3/1993 | Cinotti et al. ................. 53/228 |
| 5,189,865 A | * | 3/1993 | Andrade et al. .............. 53/228 |
| 5,205,808 A | * | 4/1993 | Gebhardt ..................... 493/359 |
| 5,954,183 A | * | 9/1999 | Boldrini et al. ............. 198/360 |
| 6,000,525 A | * | 12/1999 | Frulio ........................ 198/412 |
| 6,165,116 A | * | 12/2000 | White ......................... 493/359 |
| 6,170,635 B1 | * | 1/2001 | Rommelli .................... 198/429 |
| 6,712,746 B1 | * | 3/2004 | White ......................... 493/357 |

* cited by examiner

Primary Examiner—Louis Huynh
(74) Attorney, Agent, or Firm—Boyle, Fredrickson, Newholm, Stein & Gratz, S.C.

(57) ABSTRACT

A discharge and transfer apparatus for adjacent separated, objects, such as logs of interfolded sheets discharged from an interfolder, and for supplying the logs of sheets sequentially to downstream processing equipment, such as a packaging or wrapping mechanism for applying packaging or wrapping material about each log of sheets. The discharge and transfer apparatus includes an advancing mechanism for moving the logs of sheets in a forward direction at a location downstream of the discharge area of the interfolder, and a guide mechanism, such as a series of curved guide rails, which are operable to position the logs such that the logs are moved in a generally vertical direction toward a transfer area by operation of the advancement mechanism. At the transfer area, the logs of sheets are moved upwardly between a pair of movable discharge members, which may be in the form of facing runs of a pair of discharge belts, and the discharge belts are selectively operable to propel the uppermost log of sheets laterally in a lengthwise direction along a longitudinal axis defined by the uppermost log of sheets. The uppermost log of sheets is supplied directly to the inlet area of the downstream processing equipment.

37 Claims, 4 Drawing Sheets

VERTICALLY ORIENTED LATERAL TRANSFER SYSTEM FOR INTERFOLDED SHEETS

BACKGROUND AND SUMMARY OF THE INVENTION

This invention relates to a discharge and transfer system for handling an endmost one of a series of advancing items, and more particularly to a discharge and transfer system for supplying groups of sheets from an interfolder to a packaging machine in which the groups of sheets are banded or wrapped.

Interfolded sheets, such as paper towels or the like, are typically interfolded together in a nip defined between a pair of folding rolls. The interfolded sheets are discharged from the folding rolls in a vertical downward direction. The sheets are separated into groups or "logs" of interfolded sheets that are stacked together, and each log of sheets is supplied to a packaging machine that applies a wrapper or band about the log. The wrapped or banded log is then supplied to a cutting device, commonly known as a log saw, in which the log is cut into a series of individual packs in preparation for shipment.

Several systems are known for handling the sheets that are discharged from the folding rolls. In one such prior art system, such as is disclosed in Couturier U.S. Pat. No. 4,770,402 issued Sep. 13, 1988, the sheets are discharged from the nip between the folding rolls onto a vertically movable platform. The sheets discharged onto the platform are counted, and fingers or the like are inserted into the stack of sheets at a predetermined count in order to support the sheets discharged from the folding rolls while the stack supported on the platform is separated from the sheets supported by the fingers, by lowering the platform. The sheets are then moved off the platform by a conveyor or the like for subsequent supply to a packaging machine in which the stack of sheets is banded or wrapped. The platform is then moved upwardly to support the stack supported by the fingers, and the fingers are retracted in preparation for engagement within the stack when the sheet count reaches a predetermined number.

Another system is disclosed in copending application Ser. No. 09/565,729 filed May 5, 2000, the disclosure of which is hereby incorporated by reference. The '729 application discloses a system in which the sheets discharged from the nip between the folding rolls are guided from vertical movement at the discharge of the folding rolls to horizontal movement on a table. The table includes a belt arrangement having an upper run that underlies the sheets, and which is operable to advance the sheets on the table in a horizontal direction away from the discharge area of the folding rolls. The sheets are separated into individual groups or logs of sheets in the interfolding process, such as is disclosed in White U.S. Pat. No. 6,165,116, the disclosure of which is hereby incorporated by reference. In this manner, the individual groups or logs of sheets are advanced on the table by the upper run of the belt arrangement toward a clamping mechanism located at a downstream area of the table. The endmost group of sheets is separated from the adjacent groups of sheets at the downstream area of the table via the clamping mechanism, which engages an end of the endmost group of sheets and is then moved laterally so as to apply a lateral force to the endmost group of sheets to move the endmost group of sheets laterally in a lengthwise direction. In this system, the sheets are oriented vertically upon discharge and are subsequently turned so as to be oriented horizontally, in preparation for processing through the packaging or wrapping apparatus.

Separating the groups of sheets in the interfolder, as disclosed in the '116 patent, enables the groups of sheets to be efficiently handled upon discharge from the interfolder, and eliminates the need to separate the sheets after discharge from the interfolder as is disclosed in the '402 patent. This feature is exploited by the system disclosed in the copending '729 application, in that the endmost group of sheets can be discharged laterally in a lengthwise direction relative to the adjacent group of sheets without the need to create a separation between the endmost group of sheets and the remainder of the sheets. However, discharging the endmost group of sheets as disclosed in the copending '729 application requires that the group of sheets be rotated or "flipped" in preparation for subsequent processing through the packaging or wrapping apparatus, in order for the group of sheets to be self-supporting during advancement through the packaging or wrapping apparatus.

It is an object of the present invention to provide a discharge and transfer system for a stack or group of interfolded sheets, which eliminates the need to rotate, the sheets after discharge and prior to supply of the sheets to a packaging or wrapping apparatus. It is another object of the invention to provide such a discharge and transfer system which minimizes the number of handling steps between discharge of the sheets from the interfolder and supply of the sheets to the packaging or wrapping apparatus. It is a further object of the invention to provide such a system which takes advantage of the separation between adjacent groups of sheets created in the interfolding process. A still further object of the invention is to provide such a system which is relatively simple in its components and construction, yet which provides an efficient and effective arrangement for supplying sheets from an interfolder to a packaging or wrapping apparatus.

In accordance with one aspect of the invention, a transfer system for interfolded sheets includes an advancing arrangement for advancing the groups of separated sheets in a forward direction, a guide arrangement which directs the groups of sheets so as to move the groups of sheets in an upward direction to a transfer area, and a discharge arrangement for engaging the uppermost group of sheets at the transfer area and moving the uppermost group of sheets lengthwise to separate the uppermost group of sheets from the next adjacent group of sheets. The groups of sheets are preferably discharged in adjacent separated groups of sheets from the interfolder, and the advancing arrangement is operable to move the groups of sheets away from the interfolder in a forward direction that is generally perpendicular to a longitudinal axis defined by each group of sheets. The guide arrangement is configured to position the sheets such that the downstream or uppermost group of sheets at the transfer area is supported by a series of upstream groups of sheets located below the downstream or uppermost group of sheets.

The groups of sheets may be discharged from the interfolder in a downward direction, and the sheets are subsequently moved in a generally horizontal direction by an advancing belt arrangement on a support surface such as a table, in a manner as is known. The guide arrangement of the present invention includes an upstream portion that functions to engage the sheets during advancement, and the guide arrangement is configured to alter the direction of movement of the groups of sheets from the generally horizontal direction to a generally vertical direction at the transfer area. In one form, the guide arrangement comprises stationary curved guide wall structure that engages the groups of sheets downstream of the advancing belt arrangement and alters the direction of movement of the groups of sheets from the generally horizontal direction to the generally vertical direction. The advancing belt arrangement is operable to move the groups of sheets along the stationary guide wall by pushing the sheets along the guide wall by engagement with the upstream groups of sheets.

The discharge arrangement may be in the form of a pair of spaced apart movable members located at the transfer area, which are configured to engage the uppermost group of sheets at the transfer area and to move the uppermost group of sheets lengthwise along the longitudinal axis of the uppermost group of sheets. The separation between the uppermost group of sheets and the next adjacent group of sheets enables the uppermost group of sheets to be moved lengthwise relative to the next adjacent group of sheets. The pair of movable members may be in the form of a pair of discharge belts that define facing engagement runs between which the uppermost group of sheets is located when the uppermost group of sheets is at the transfer area, and operation of the discharge belts functions to propel the uppermost group of sheets in a lengthwise direction.

In accordance with another aspect of the invention, a downstream processing apparatus, such as a packaging or wrapping apparatus, is located adjacent the transfer area, and includes an inlet area that is adapted to receive a group of sheets. The downstream processing apparatus is configured to move the group of sheets in a lengthwise direction for subsequent processing, such as application of packaging or wrapping material about the group of sheets as the group of sheets is moved through the packaging or wrapping apparatus. The inlet area of the downstream processing apparatus is located adjacent and in alignment with the transfer area, such that lengthwise movement of the group of sheets from the transfer area by operation of the discharge belts functions to move the uppermost stack of sheets into the inlet area of the downstream processing apparatus.

The invention contemplates a discharge and transfer system as summarized above, as well as a method of transferring a group of sheets, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
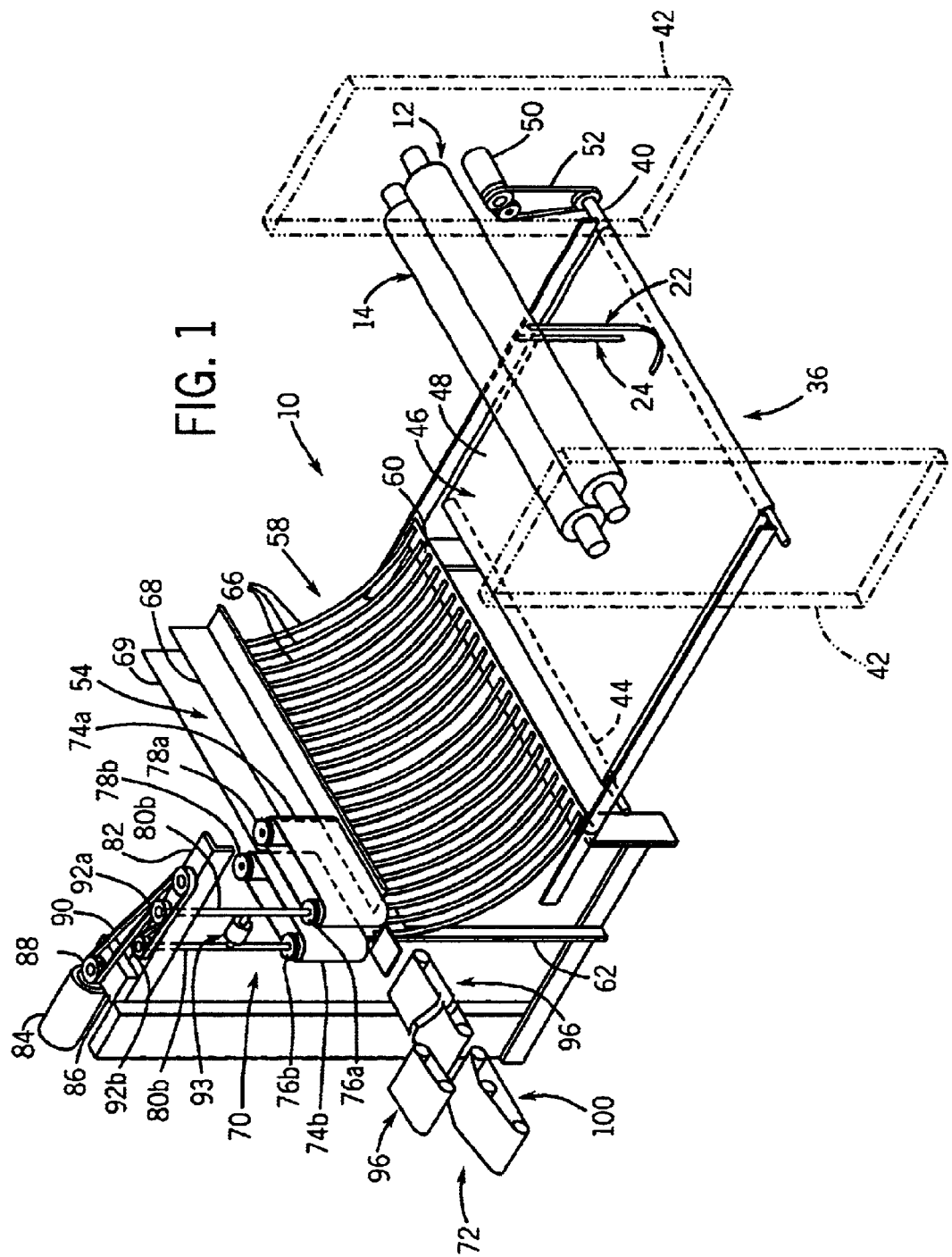
FIG. 1 is an isometric view illustrating a discharge and transfer system for interfolded sheets in accordance with the present invention.
Figure 2:
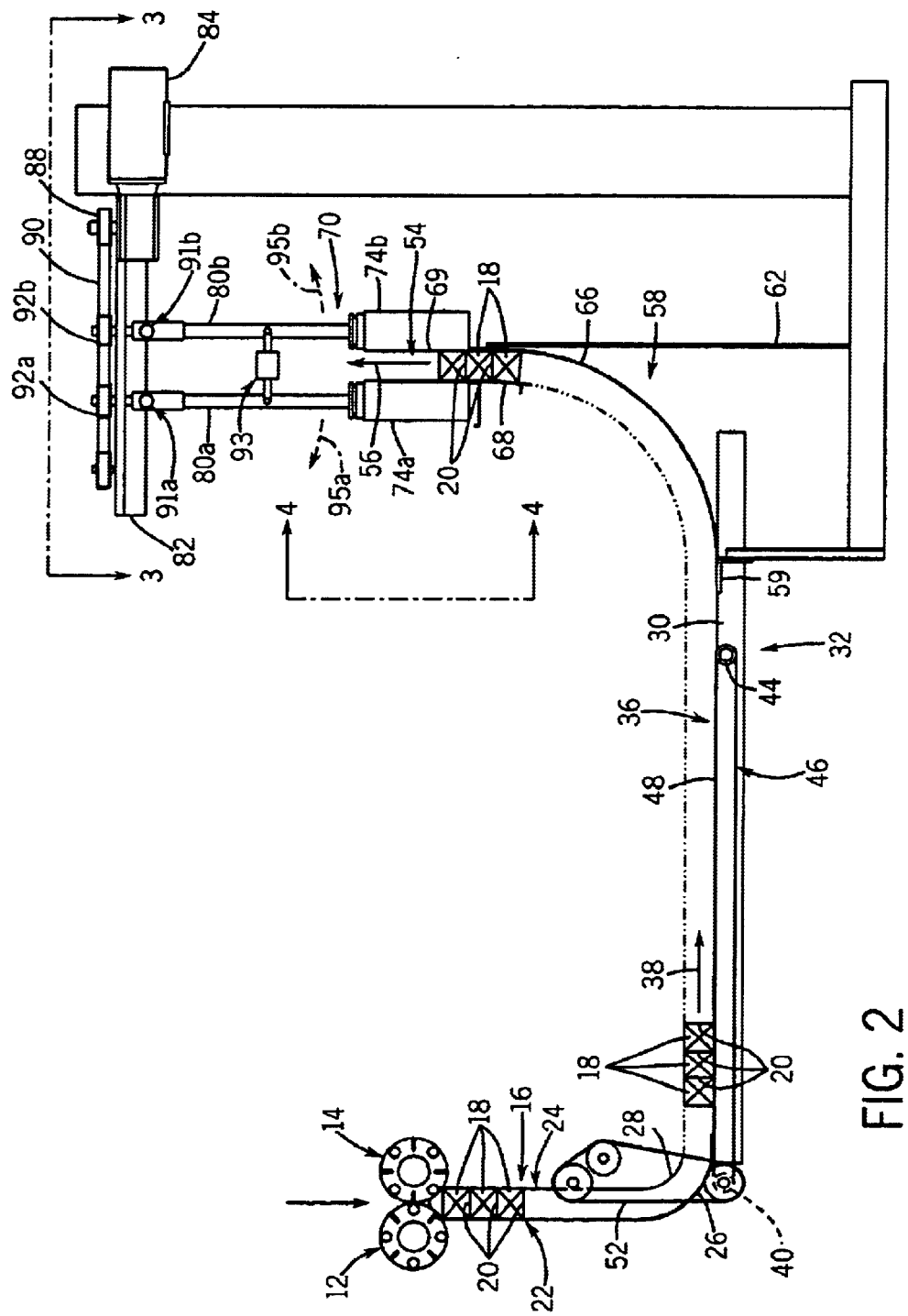
FIG. 2 is a side elevation view illustrating the discharge and transfer system of FIG. 1, showing the manner in which adjacent separated groups of sheets are advanced through the discharge and transfer system.
Figure 3:
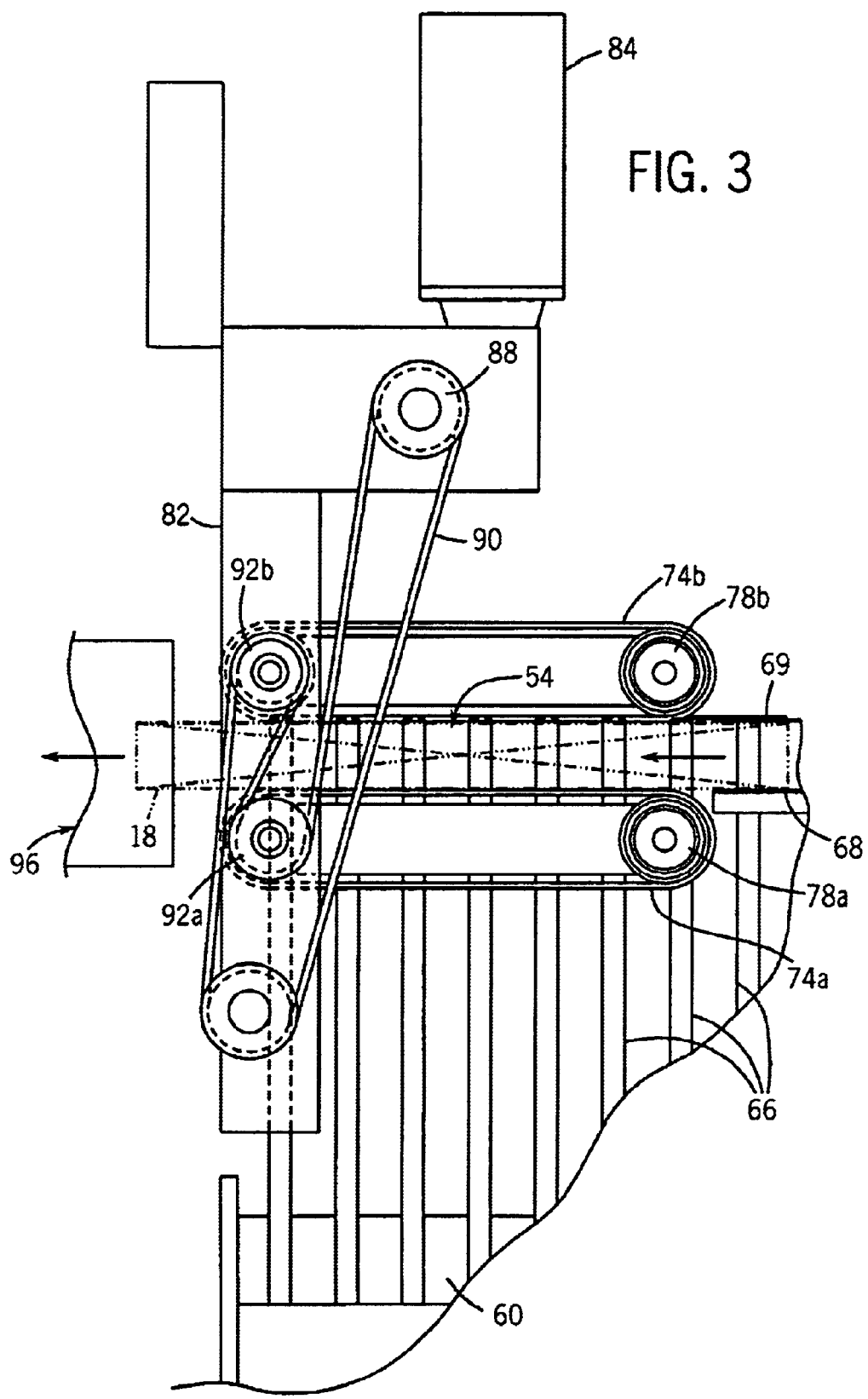
FIG. 3 is a partial top plan view of a portion of the discharge and transfer system of FIGS. 1 and 2, with reference to line 3—3 of FIG. 2, showing a discharge arrangement which is operable to discharge the uppermost group of sheets in a lengthwise direction at a transfer area defined by the discharge and transfer system.

FIGS. 1 and 2 illustrate a discharge and transfer apparatus 10 constructed according to the invention, located downstream from a pair of interfolding rolls 12, 14. In a manner as shown and described in White U.S. Pat. No. 6,165,116 granted Dec. 26, 2000, previously incorporated by reference, rolls 12, 14 function to fold staggered, overlapping sheets, such as paper towels, into a stack 16 of interfolded sheets. Stack 16 consists of a series of groups or "logs" 18 of interfolded sheets of a predetermined sheet count, with a separation 20 formed between adjacent logs 18. Each log 18 is made up of interfolded sheets which are folded by rolls 12, 14 such that the panels of the sheets are interfolded, in a manner as is known, other than at each A separation 20. As described in the above-noted '116 patent, separation 20 may be formed by displacing one of the sheets upstream of folding rolls 12, 14 and feeding the displaced sheet through folding rolls 12, 14 along with the next upstream sheet. In this manner, rolls 12, 14 discharge a pair of sheets which do not have an interfolded sheet therebetween so as to remove the interlock between the adjacent sheets. With this arrangement, the stack 16 discharged from folding rolls 12, 14 is pre-separated into logs 18, each of which has a predetermined number of sheets according to a desired sheet count.

After discharge from folding rolls 12, 14, stack 16 is received within a space defined between stack discharge guides 22, 24, which define upper ends that terminate adjacent the discharge area located between folding rolls 12, 14, so as to receive logs 18 of interfolded sheets discharged from folding rolls 12, 14. Guides 22, 24 define curved lower sections 26, 28, respectively, which provide a transition for movement of logs 18 from a vertical direction to a horizontal direction. With this arrangement, logs 18 of stack 16 are discharged horizontally from the curved lower sections 26, 28 of guides 22, 24, respectively, onto a support surface 30 defined by a discharge table 32, which supports stack 16 above a supporting surface such as a floor. Table 32 includes an advancing mechanism, which may be in the form of a belt arrangement 36, and which is designed and configured to advance the logs 18 of interfolded sheets in a forward or downstream direction along support surface 30 of table 32, in the direction of arrow 38 (FIG. 2). In this manner, the horizontally oriented stack 16 of logs 18 is moved away from an outlet defined between the downstream ends of curved lower guide sections 26, 28. Belt arrangement 36 may include a drive shaft or roller 40, which may be rotatably mounted to and between a pair of supports 42 (which may also be used to rotatably mount folding rolls 12, 14), in combination with a driven shaft or roller 44 and a belt 46 engaged with rollers 40, 44. Belt 46 defines an upper run 48 which is supported by table support surface 30, and which underlies logs 18. A drive motor 50 may also be mounted to one of supports 42, and is drivingly engaged with drive shaft or roller 40 through a suitable drive arrangement including a series of pulleys and a drive belt 52, in a conventional manner. Alternatively, the advancing mechanism may be in the form of a series of narrow, spaced apart belts in place of the single advancing belt 46 as shown, which operate in the same manner as belt 46 to advance logs 18 in a downstream or forward direction along table support surface 30. In either case, the direction of movement of logs 18 along table support surface 30 is generally perpendicular to the longitudinal axes of logs 18.

The general construction and operation of the above-described components of discharge and transfer apparatus 10 are shown and described in copending application Ser. No. 09/565,729 filed May 5, 2000, previously incorporated by reference.

Downstream of the advancing mechanism defined by belt arrangement 36, discharge and transfer apparatus 10 includes a guide arrangement for altering the direction of movement of logs 18 from a horizontal direction to an upward, generally vertical direction at a transfer area 54, such that the endmost logs 18 of stack 16 are advanced in a generally upward direction, as denoted by arrow 56, at transfer area 54.

The guide arrangement includes curved guide wall structure 58, which defines a horizontal upstream end secured to and supported by a transverse lower support member 60, and a vertical downstream end located at transfer area 54, supported by a guide wall support frame including a pair of spaced apart vertical supports 62 and a transverse horizontal upper support member 64 extending between vertical supports 62 and interconnected with the upper area of guide wall structure 58. In the illustrated embodiment, guide wall structure 58 consists of a series of spaced apart arcuate guide rails 66, each of which is secured to transverse lower support member 60 at its lower end and secured to transverse upper support member 64 at its upper end. Guide rails 66 define an arc of 90°, to convert horizontal movement of logs 18 on support surface 30 to vertical movement of logs 18 at transfer area 54. It is understood that the illustrated embodiment of guide wall; structure 58 is representative, and that other configurations are possible and are contemplated within the scope of the present invention. For example, and without limitation, guide rails 66 may be replaced with a unitary curved guide wall that is solid throughout its width, without the spaces that are present between guide rails 66 in the illustrated embodiment. Further, while guide rails 66 are shown and described as having an arc of 90°, to convert horizontal movement of logs 18 to vertical movement, the included angle of guide wall structure 58 may vary so as to alter the direction of movement of logs 18 to any desired directions of movement at a downstream location relative to a forward direction of movement of logs 18 at an upstream location.

An inner guide 68 includes a lower portion that is spaced from the upper portions of guide rails 66 immediately below transfer area 54, and an upper portion that extends into transfer area 54. Inner guide 68 may be in the form of wall member having a continuous inner surface, or may be in the form of a series of spaced apart rails similar to the construction of guide rails 66. Inner guide 68 has a curvature corresponding to that of the upper portions of guide rails 66, and is spaced from guide rails 66 a distance slightly, greater than the width of logs 18. In this manner, logs 18 move between guide rails 66 and inner guide 68 as logs 18 advance toward transfer area 54, and inner guide 68 functions to maintain stack 16 of logs 18 in a vertically upright orientation below transfer area 54. I.

A discharge arrangement is located at transfer area 54, for discharging the uppermost log 18 in a lateral or lengthwise direction. The discharge arrangement may be in the form of a discharge mechanism 70 located at transfer area 54, which is operable to discharge the uppermost log 18 from the next adjacent log 18, for subsequent processing such as for packaging or wrapping of the uppermost log 18. In the illustrated embodiment, a downstream processing apparatus such as a packaging or wrapping mechanism 72 is located adjacent transfer area 54, and is adapted to receive the uppermost log 18 that is discharged from the upper end of stack 16 at discharge area 54. In the illustrated embodiment, the packaging or wrapping mechanism 72 may be in the form of a wrapping mechanism such as is available from Fabio Perini North America, Inc. of Green Bay, Wis.

Discharge mechanism 70 is in the form of a pair of selectively operable discharge members, such as discharge belts 74a, 74b, that are located at transfer area 54 and are selectively operable so as to propel the uppermost log 18 in a lateral or lengthwise direction when the uppermost log 18 has reached a predetermined elevation at transfer area 74. Belts 74a, 74b are engaged with drive rollers 76a, 76b, respectively, and are trained about idler rollers 78a, 78b, respectively. Drive shafts 80a, 80b are engaged with drive rollers 76a, 76b, respectively, which extend downwardly from a support member 82 located above transfer area 54. With this arrangement, discharge belts 74a, 74b and respective drive rollers 76a, 76b, idler rollers 78a, 78b and drive shafts 80a, 80b, are supported by support member in a suspended manner at transfer area 54.

A drive motor 84 is mounted to a suitable support 86, and includes a rotatable output member 88, which may be in the form of a pulley, which is engaged by a flexible drive member such as a drive belt 90. Drive shafts 80a, 80b extend from input drive members 92a, 92b, respectively, which may be in the form of pulleys, that are engaged with drive belt 90 so as to rotate in opposite directions by virtue of the manner in which drive belt 90 is engaged with input members 92a, 92b. With this arrangement, operation of drive motor 84 functions to selectively impart movement to discharge belts 74a, 74b so as to move belts 74a, 74b in opposite directions, in which the facing, spaced apart runs of belts 74a, 74b are moved in a direction toward packaging or wrapping mechanism 72.

As shown in FIGS. 1 and 2, drive shafts 80a, 80b include respective flexible joints 91a, 91b, which may be in the form of universal joints, and which are operable to drivingly connect drive shafts 80a, 80b with stub shafts that extend downwardly from respective input members 92a, 92b. Each of drive shafts 80a, 80b includes an external casing or other non-rotatable outer structure, and an extendible and retractable cylinder assembly 93 extends between and interconnects the external casings of drive shafts 80a, 80b. Cylinder assembly 93 is arranged and configured such that retraction of cylinder assembly 93 functions to place discharge belts 74a, 74b in an operative position as shown in FIGS. 1 and 2, wherein the facing engagement runs of discharge belts 74a, 74b are oriented parallel to each other. Extension of cylinder assembly 93 is operable to move discharge belts 74a, 74b apart to an open, inoperative position, by pivoting drive shafts 80a, 80b about respective universal joints 91a, 91b in the direction of respective arrows 95a, 95b.

Belts 74a, 74b are located toward one side of transfer area 54, adjacent packaging or wrapping mechanism 72. Throughout the remainder of the length of transfer area 54, the upper portion of inner guide 68 extends upwardly into transfer are a 54 to provide inner support for the uppermost log 18. In addition, an outer vertical support 69 is spaced from the upper portion of inner guide 68, to provide outer support for the uppermost log 18. In this manner, the uppermost log 18 is maintained upright by the engagement runs of belts 74a, 74b, in combination with the upper portion of inner guide 68 and outer vertical support 69.

Figure 4:
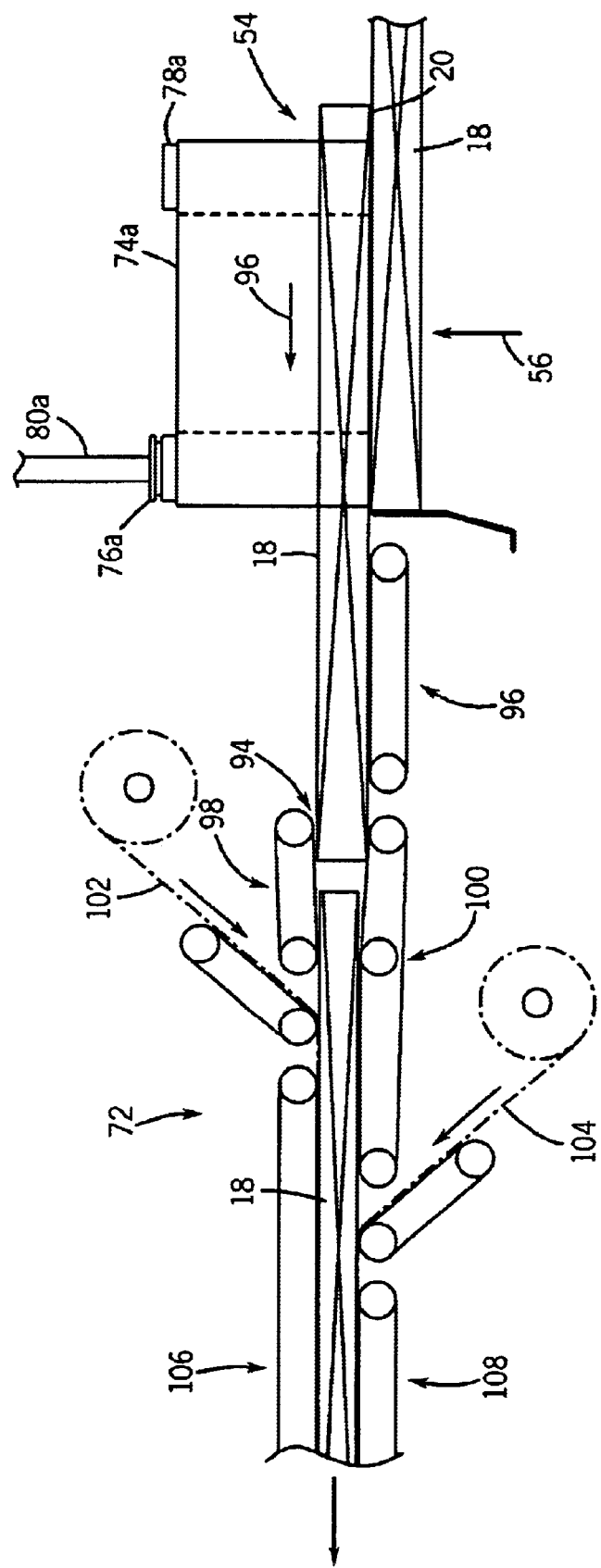
FIG. 4 is a partial elevation view, with reference to line 4—4 of FIG. 2, showing the transfer area of the discharge and transfer system of the present invention and an adjacent packaging or wrapping apparatus for applying wrapping material about a group of sheets discharged from the transfer area.

In operation, discharge and transfer apparatus 10 functions as follows in order to advance logs 18 of interfolded sheets in a downstream from folding rolls 12, 14 for supply to packaging or wrapping mechanism 72. Initially, the movement of stack 16 of logs 18 from the nip between folding rolls 12, 14 is converted from downward vertical movement to forward horizontal movement via stack discharge guides 22, 24, as noted previously Operation of belt arrangement 36 then functions to advance logs 18 along support surface 30 of table 32 in the downstream direction of arrow 38, toward the discharge or downstream end of belt arrangement 36. When the logs 18 move off upper run 48 of belt 46, the logs; 18 are pushed in a downstream direction on support surface 30 downstream of belt 46 by virtue of the engagement of the upstream logs 18 with upper run 48 of belt 46. Such movement of logs 18 downstream of belt arrangement 36 continues as the logs 18 are moved onto guide rails 66, such that the logs 18 engaged with guide rails 66 are pushed along guide rails 16 by engagement of the upstream logs 18 with upper run 48 of belt 46. Such movement of logs 18 along guide rails 64 continues, and the logs 18 are moved into the space between inner guide 68 and the upper portions of guide rails 66, which cooperate to maintain the logs 18 in an upright orientation as the logs 18 approach transfer area 54. At transfer area 54, discharge belts 74a, 74b are maintained in the open, inoperative position by operation of cylinder assembly 93, and are positioned such that the facing engagement runs of belts 74a, 74b are spaced apart a distance greater that the width of logs 18. Continued advancement of logs 18 in this manner causes the logs 18 to enter transfer area 54, at which the uppermost one of logs 18 is moved into the area between the facing runs of discharge belts 74a, 74b. The uppermost one of logs 18 continues upward movement between belts 74a, 74b, until the upper surface of the uppermost log 18 reaches a predetermined elevation, which may be sensed by a photocell or the like, and which corresponds to the elevation of an inlet area 94 defined by packaging or wrapping mechanism 72. The predetermined elevation of the uppermost log 18 is selected so that the separation 20 between the uppermost log 18 and the next adjacent log 18 is located slightly below the lowermost extent of discharge belts 74a, 74b. During such upward movement of the uppermost log 18 into transfer area 54, the uppermost log 18 is supported by the upper portion of inner guide 68 in combination with outer vertical guide 69. In addition, the facing engagement runs of discharge belts 74a, 74b are positioned only slightly away from the sides of the uppermost stack 18 when discharge belts 74a, 74b are in the inoperative position, such that the facing engagement runs of discharge belts 74a, 74b function to maintain the portion of the uppermost log 18 therebetween in an upright position. When the uppermost log 18 reaches the predetermined elevation, cylinder assembly 93 is retracted so as to move discharge belts 74a, 74b together, which results in engagement of the facing engagement runs of discharge belts 74a, 74b with the sides of the uppermost stack 18. Motor 84 is then operated so as to impart movement to discharge belts 74a, 74b in the direction of arrow 96 (FIG. 4). Such operation of discharge belts 74a, 74b functions to propel the uppermost log 18 laterally in a lengthwise direction, along the longitudinal axis defined by the uppermost log 18, toward inlet 94 of packaging or wrapping mechanism 72. An intermediate conveyor 96, as shown in FIGS. 1 and 4, may be positioned between transfer area 54 of discharge and transfer apparatus 10 and inlet 94 of packaging or wrapping mechanism 72, for supporting log 18 and for assisting log 18: in transverse movement from the discharge of discharge belts 74a, 74b toward inlet 94 of packaging or wrapping apparatus 72. Thereafter, packaging or wrapping apparatus 72 is operable to apply and bond together respective upper and lower webs 102, 104 of packaging material, to form a sleeve about the log 18. The wrapped or banded log 18 is then discharged from packaging or wrapping mechanism 72 via upper and lower belts 106, 108, respectively, in a known manner, for subsequent processing such as cutting into individual packs using a conventional log saw.

It can thus be appreciated that the present invention functions to orient the endmost log 18 such that the interfolded sheets of the log 18 are oriented horizontally. In this manner, the log 18 can be moved directly from transfer area 54 into the inlet 94 of packaging or wrapping apparatus 72, without intermediate handling as was required in the prior art. Further, the vertical upward movement of the endmost log enables the endmost log to be separated and moved lengthwise in a lateral direction relative to the underlying log, without the need to provide intermediate support for the logs other than the endmost log, as was required in the prior art.

While the invention has been shown and described with respect to a specific embodiment, it is understood that various alternatives and modifications are possible and are contemplated as being within the scope of the present invention. For example, and without limitation, while the movement of logs 18 is converted from a horizontal direction to: a vertical direction using stationary guide rails 66, it is also contemplated that a movable belt arrangement or the like may be employed to drivingly engage the logs as movement of the logs is converted from a horizontal direction to a vertical direction. In addition, while movable discharge belts 74a, 74b are located at transfer area 54 for discharging the uppermost log 18, it is also contemplated that any other satisfactory mechanism may be employed for applying a lateral or lengthwise force to the uppermost log 18 and for translating the uppermost log 18 relative to the next adjacent log 18. For example, a selectively operable clamp arrangement such as is disclosed in the copending '729 application may be employed for gripping the end of the uppermost log 18 and moving the uppermost log 18 laterally in a lengthwise direction onto intermediate conveyor 96 and/or into inlet 94 of packaging or wrapping mechanism 72. In addition, while the invention has been shown and described with respect to discharging only the uppermost log of sheets, it is also contemplated that the invention may be used to discharge and transfer two or more logs of sheets from the upper end of the stack of sheets at the transfer area. Further, while the discharge mechanism is shown as discharging the uppermost log of sheets into a packaging or wrapping apparatus, it is understood that the uppermost log of sheets may be supplied downstream of discharge and transfer apparatus 10 to any suitable downstream processing equipment for subsequent processing or handling.

It is also contemplated that the discharge and transfer system of the present invention may be used to handle elongated objects other than stacks of interfolded sheets, in any application in which adjacent elongated objects are adapted to be advanced in a forward direction that is perpendicular to the longitudinal axes of the objects and subsequently discharged by movement of an endmost one of the objects relative to the next adjacent object in a direction along the longitudinal axis of the endmost object.

Various alternatives and embodiments are contemplated as being within the scope of the following claims particularly pointing out and distinctly claiming the subject matter regarded as the invention.

I claim:

1. A method of moving an endmost group of interfolded sheets relative to an adjacent group of interfolded sheets, wherein the groups of sheets are supplied from an interfolder and are separated from each other, and wherein each group of sheets extends along a longitudinal axis and defines a length, comprising the steps of:

advancing the groups of sheets away from the interfolder;

orienting the groups of sheets, during advancement of the groups of sheets away from the interfolder, such that the endmost group of sheets is moved in an upward direction by advancement of the next adjacent group of sheets and is supported from below by one or more underlying groups of sheets, wherein the endmost group of sheets and the underlying groups of sheets extend along parallel longitudinal axes; and moving the endmost group of sheets in a lengthwise direction along the longitudinal axis of the endmost group of sheets relative to the next adjacent group of sheets and in a direction parallel to the longitudinal axes of the underlying groups of sheets, wherein the separation between the endmost group of sheets and the next adjacent underlying group of sheets enables the endmost group of sheets to be moved lengthwise relative to the next adjacent underlying group of sheets.

2. The method of claim 1, wherein the step of orienting the groups of sheets during advancement is carried out by moving the groups of sheets away from the interfolder and engaging the groups of sheets with a stationary guide arrangement that is configured to position the endmost group of sheets so as to move upwardly as the sheets below the endmost group of sheets are advanced.

3. The method of claim 2, wherein the step of advancing the groups of sheets is carried out by moving the groups of sheets downstream of the interfolder on a movable belt arrangement, wherein movement of the belt arrangement is operable to advance the sheets away from the interfolder and toward the stationary guide arrangement.

4. The method of claim 2, wherein the step of moving the endmost group of sheets in a lengthwise direction is carried out by positioning the endmost group of sheets between a pair of selectively operable discharge members, and operating the discharge members to move the endmost group of sheets lengthwise relative to the next adjacent group of sheets.

5. The method of claim 4, wherein the discharge members comprise a pair of selectively operable discharge belts, wherein the discharge belts define spaced apart facing engagement runs, and wherein the step of positioning the endmost group of sheets between the pair of selectively operable discharge members comprises positioning the endmost group of sheets between the facing engagement runs of the discharge belts.

6. A transfer system for interfolded sheets that are discharged in adjacent separated groups from an interfolder, wherein each group of sheets extends along a longitudinal axis and defines a length, comprising:

an advancing arrangement for advancing the groups of sheets in a forward direction from the interfolder toward a transfer area;

a guide arrangement configured to cooperate with the advancing arrangement to change the direction of movement of the groups of sheets such that the sheets are moved in an upward direction at the transfer area, wherein the endmost group of sheets comprises an uppermost group of sheets at the transfer area that is supported by a series of lower groups of sheets, wherein the uppermost group of sheets and the lower groups of sheets extend along parallel longitudinal axes; and a discharge arrangement for engaging the uppermost group of sheets at the transfer area, wherein the discharge arrangement is configured to move the uppermost group of sheets from the transfer area lengthwise along the longitudinal axis of the uppermost group of sheets in a direction parallel to the longitudinal axes of the lower groups of sheets, wherein the separation between the uppermost group of sheets and the next adjacent group of sheets enables the lengthwise movement of the uppermost group of sheets relative to the next adjacent lower group of sheets.

7. The transfer system of claim 6, wherein the groups of sheets are discharged from the interfolder in a downward direction, and wherein the guide arrangement comprises stationary first guide structure that is configured to alter the direction of movement of the sheets from the downward direction to the forward direction.

8. The transfer system of claim 7, wherein the forward direction is generally horizontal, and wherein the advancing arrangement comprises a movable belt arrangement that supports the groups of sheets and moves the sheets in the horizontal direction.

9. The transfer system of claim 8, wherein the guide arrangement further includes stationary second guide structure that is configured to alter the direction of movement of the sheets from the horizontal forward direction to the upward direction.

10. The transfer system of claim 9, wherein the second guide structure is configured such that the upward direction is generally vertical.

11. The transfer system of claim 6, wherein the advancing arrangement and the guide arrangement are configured to convert movement of the sheets from a generally horizontal direction downstream of the interfolder to a generally vertical direction at the transfer area.

12. The transfer system of claim 11, wherein the advancing arrangement includes a movable belt member that supports the sheets and is configured to move the sheets in the generally horizontal direction, and wherein the guide arrangement includes curved guide structure that receives the sheets from the movable belt member, wherein the curved guide structure is configured to convert movement of the sheets from the generally horizontal direction at a downstream end of the movable belt member to the generally vertical direction at the transfer area, and wherein the movable belt member advances the sheets along the curved guide structure by pushing the sheets upwardly on the curved guide structure via engagement of the movable belt member with the sheets located upstream of the sheets that are supported by the curved guide structure.

13. The transfer system of claim 6, wherein the discharge arrangement includes a pair of spaced apart selectively operable belt members located at the transfer area, and wherein the upward movement of the uppermost group of sheets at the transfer area is operable to move the uppermost group of sheets into a space between the belt members, wherein operation of the belt members functions to propel the uppermost group of sheets lengthwise along the longitudinal axis of the uppermost group of sheets.

14. The transfer system of claim 13, further comprising a packaging apparatus having an inlet area located adjacent the transfer area, wherein the packaging apparatus is configured to apply packaging material about a group of sheets during movement of the group of sheets through the packaging apparatus, wherein the inlet area of the packaging apparatus is located in alignment with the longitudinal axis of the uppermost group of sheets such that the lengthwise movement of the group of sheets from the transfer area by operation of the pair of belt members moves the group of sheets into the inlet area of the packaging apparatus.

15. A transfer system for interfolded sheets that are discharged in adjacent separated groups from an interfolder, wherein each group of sheets extends along a longitudinal axis and defines a length, comprising:

an advancing arrangement for advancing the groups of sheets in a forward direction from the interfolder toward a transfer area;

a guide arrangement configured to cooperate with the advancing arrangement to change the direction of movement of the groups of sheets such that the sheets are moved in an upward direction at the transfer area wherein, the endmost group of sheets comprises an uppermost group of sheets at the transfer area that is supported by a series of lower groups of sheets; and a discharge arrangement for engaging the uppermost group of sheets at the transfer area, wherein the discharge arrangement is configured to move the uppermost group of sheets lengthwise along the longitudinal axis of the uppermost group of sheets, wherein the separation between the uppermost group of sheets and the next adjacent group of sheets enables the lengthwise movement of the uppermost group of sheets relative to the next adjacent group of sheets, wherein the discharge arrangement includes a pair of spaced apart selectively operable belt members located at the transfer area, and wherein the upward movement of the uppermost group of sheets at the transfer area is operable to move the uppermost group of sheets into a space between the belt members, wherein operation of the belt members functions to propel the uppermost group of sheets lengthwise along the longitudinal axis of the uppermost group of sheets.

16. The transfer system of claim 15, further comprising a packaging apparatus having an inlet area located adjacent the transfer area, wherein the packaging apparatus is configured to apply packaging material about a group of sheets during movement of the group of sheets through the packaging apparatus, wherein the inlet area of the packaging apparatus is located in alignment with the longitudinal axis of the uppermost group of sheets such that the lengthwise movement of the group of sheets from the transfer area by operation of the pair of belt members moves the group of sheets into the inlet area of the packaging apparatus.

17. A method of moving an endmost group of interfolded sheets relative to an adjacent group of interfolded sheets, wherein the groups of sheets are supplied from an interfolder and are separated from each other, and wherein each group of sheets extends along a longitudinal axis and defines a length comprising the steps of:

advancing the groups of sheets away from the interfolder;

orienting the groups of sheets, during advancement of the groups of sheets away from the interfolder, by engaging the groups of sheets with a stationary guide arrangement that is configured to position the endmost group of sheets so as to move upwardly as the sheets below the endmost group of sheets are advanced, such that the endmost group of sheets is moved in an upward direction by advancement of the next adjacent group of sheets and is supported from below by the next adjacent group of sheets; and moving the endmost group of sheets in a lengthwise direction relative to the next adjacent group of sheets by positioning the endmost group of sheets between a pair of selectively operable discharge members, and operating the discharge members to move the endmost group of sheets lengthwise relative to the next adjacent group of sheets, wherein the separation between the endmost group of sheets and the next adjacent group of sheets enables the endmost group of sheets to be moved lengthwise relative to the next adjacent group of sheets, wherein the discharge members comprise a pair of selectively operable discharge belts, wherein the discharge belts define spaced apart facing engagement runs, and wherein the step of positioning the endmost group of sheets between the pair of selectively operable discharge members comprises positioning the endmost group of sheets between the facing engagement runs of the discharge belts.

18. A packaging system for packaging a group of interfolded sheets discharged from an interfolder, wherein the group of interfolded sheets extends along a longitudinal axis and defines a length, comprising:

a supply arrangement for supplying the group of interfolded sheets via upward movement of the group of sheets to a transfer area located at a predetermined first elevation, wherein the supply arrangement is operable to supply an uppermost group of sheets to the transfer area;

a packaging arrangement for applying web-type packaging material about the group of sheets, wherein the packaging arrangement includes an upstream end located at the first elevation and an advancement system located downstream of the upstream end for advancing the group of sheets in a lengthwise direction along the longitudinal axis of the group of sheets; and a transfer arrangement configured to move the uppermost group of sheets in a lengthwise direction at the first elevation directly from the transfer area to the upstream end of the advancement system along the longitudinal axis of the uppermost group of sheets without altering the orientation of the uppermost group of sheets between the transfer area and the upstream end of the packaging arrangement.

19. The packaging system of claim 18, wherein the supply arrangement is located downstream of an interfolder that supplies the sheets in separated adjacent groups of sheets, and wherein the supply arrangement is configured to orient the sheets such that the uppermost group of sheets is advanced in an upward direction to the transfer area and is supported by one or more adjacent lower groups of sheets located below the uppermost group of sheets, wherein the uppermost group of sheets and the one or more lower groups of sheets extend along parallel longitudinal axes, and wherein the transfer arrangement is operable to move the uppermost group of sheets from the transfer area to the upstream end of the advancement system along the longitudinal axis of the uppermost group of sheets in a direction parallel to the longitudinal axes of the one or more lower groups of sheets.

20. The packaging system of claim 19, wherein the supply arrangement includes an advancing mechanism that moves the sheets away from the interfolder toward the transfer area, and guide structure configured to orient the sheets such that the uppermost group of sheets moves vertically upwardly at the transfer area.

21. The packaging system of claim 20, wherein the advancing mechanism includes a movable belt arrangement having an upper run that supports the sheets and is operable to move the sheets away from the interfolder and toward the transfer area, wherein the upper run of the belt arrangement extends in a generally horizontal direction, and wherein the guide structure is located downstream of the belt arrangement and includes stationary curved wall structure that engages the groups of sheets advanced by the movable belt arrangement and alters the direction of movement of the sheets from the horizontal direction at a downstream end defined by the belt arrangement, to a vertical direction at the transfer area.

22. The packaging system of claim 18, wherein the transfer arrangement is operable to engage an end area of the uppermost groups of sheets, and to apply an axial pulling force on the uppermost group of sheets to move the uppermost group of sheets in a lengthwise direction along the longitudinal axis of the uppermost group of sheets relative to the next adjacent group of sheets.

23. The packaging system of claim 22, wherein the transfer arrangement includes a pair of selectively operable belts located at the transfer area that define spaced apart, facing discharge runs, wherein the supply arrangement is configured to orient the sheets such that an uppermost group of sheets is advanced in an upward direction to the space between the discharge runs of the pair of belts and is supported by adjacent groups of sheets located below the uppermost group of sheets, wherein operation of the pair of belts functions to propel the uppermost group of sheets in the lengthwise direction relative to the next adjacent group of sheets toward the upstream end of the advancement system of the packaging arrangement.

24. A packaging system for packaging a group of interfolded sheets discharged from an interfolder, wherein the group of interfolded sheets extends along a longitudinal axis and defines a length, comprising:
a supply arrangement for supplying the group of interfolded sheets via upward movement of the group of sheets to a transfer area located at a predetermined first elevation;
a packaging arrangement for applying web-type packaging material about the group of sheets, wherein the packaging arrangement includes an upstream end located at the first elevation and an advancement system located downstream of the upstream end for advancing the group of sheets in a lengthwise direction along the longitudinal axis of the group of sheets; and
a transfer arrangement configured to move the group of sheets in a lengthwise direction at the first elevation from the transfer area to the upstream end of the advancement system along the longitudinal axis of the group of interfolded sheets, wherein the transfer arrangement is operable to engage an end area of an uppermost one of the groups of sheets, and to apply an axial pulling force on the endmost group of sheets to move the endmost group of sheets in a lengthwise direction along the longitudinal axis of the group of sheets relative to the next adjacent group of sheets, wherein the transfer arrangement includes a pair of selectively operable belts located at the transfer area that define spaced apart, facing discharge runs, wherein the supply arrangement is configured to orient the sheets such that an uppermost group of sheets is advanced in an upward direction to the space between the discharge runs of the pair of belts and is supported by adjacent groups of sheets located below the uppermost group of sheets, wherein operation of the pair of belts functions to propel the uppermost group of sheets in the lengthwise direction relative to the next adjacent group of sheets toward the upstream end of the advancement system of the packaging arrangement.

25. A discharge system for discharging an endmost object from a series of separated, adjacent objects, wherein each object extends along a longitudinal axis and defines a length, comprising:
advancement means for advancing the objects in a forward direction perpendicular to the longitudinal axes of the objects;
guide means for positioning the objects such that the endmost object moves upwardly during operation of the advancement means, wherein the endmost object comprises an uppermost object supported by one or more lower objects located below the uppermost object, wherein the uppermost object and the lower objects extend along parallel longitudinal axes; and
transfer means for engaging the uppermost objects and moving the uppermost object lengthwise along the longitudinal axis of the uppermost object and in a direction parallel to the longitudinal axes of the one or more lower objects, wherein the separations between the objects enables the uppermost object to be moved lengthwise relative to the one or more lower objects.

26. The discharge system of claim 25, wherein the advancement means comprises support means for supporting the objects from below, and a movable advancement mechanism associated with the support means and engaged with the objects, wherein the movable advancement mechanism is operable to advance the objects in the forward direction toward the guide means as the objects are supported by the support means.

27. The discharge system of claim 26, wherein the movable advancement mechanism comprises a movable belt arrangement defining an upper run underlying and engaged with the objects, wherein operation of the belt arrangement functions to move the upper run to advance the objects.

28. The discharge system of claims 25, wherein the objects are moved in a generally horizontal direction by operation of the advancement means, and wherein the guide means comprises stationary guide structure that engages the objects and alters the direction of movement of the objects from the generally horizontal direction to a generally vertical direction at a transfer location, wherein the transfer means is located at the transfer location.

29. The discharge system of claim 28, wherein the advancement means comprises a movable belt arrangement defining an upper run underlying the objects and defining a downstream discharge end, and wherein the stationary guide structure comprises a curved guide wall extending from the downstream discharge end of the movable belt arrangement, wherein the movable belt arrangement is operable to push the objects upwardly on the curved guide wall to orient the objects such that the uppermost object is moved in the generally vertical direction at the transfer area.

30. The discharge system of claim 25, wherein the transfer means comprises a pair of spaced apart movable members that engage the uppermost object and apply an axial pulling force to the uppermost object to separate the uppermost object from the next adjacent object.

31. The discharge system of claim 30, wherein the pair of spaced apart movable members comprises a pair of selectively operable discharge belts that define spaced apart facing engagement runs, wherein the guide means is operable to orient the objects such that the uppermost object is moved between the engagement runs of the pair of discharge belts.

32. The discharge system of claim 31, further comprising means for moving the pair of discharge belts between an open inoperative position for receiving the uppermost object therebetween during advancement of the objects, and a closed operative position in which the engagement runs of the pair of discharge belts are moved into engagement with the sides of the uppermost object.

33. The discharge system of claim 31, wherein the advancement means is operable to move the objects in a generally horizontal direction, and wherein the guide means comprises stationary guide wall structure configured to alter the direction of movement from the generally horizontal direction to a generally vertical direction at a transfer area at which the pair of discharge belts are located.

34. The discharge system of claim 25, wherein the transfer means is located at a transfer area, and further comprising packaging means located adjacent and in alignment with the transfer area for applying packaging material about the object discharged from the discharge system, wherein the packaging means includes an inlet area adjacent the transfer area and wherein the transfer means is operable to advance the object directly from the transfer area into the inlet area of the packaging means in a direction along the longitudinal axis of the object and parallel to the longitudinal axes of the one or more lower objects without altering the orientation of the object between the transfer area and the inlet area.

35. A discharge system for discharging an endmost object from a series of separated objects, wherein each object extends along a longitudinal axis and defines a length, comprising:

advancement means for advancing the objects in a forward direction perpendicular to the longitudinal axes of the objects;

guide means for positioning the objects such that the endmost object moves upwardly during operation of the advancement means, wherein the endmost object comprises an uppermost object supported by the objects located below the uppermost object; and transfer means for engaging the uppermost object and moving the uppermost object lengthwise along the longitudinal axis of the uppermost object, wherein the separations between the objects enables the uppermost object to be moved lengthwise relative to the next adjacent object, wherein the transfer means comprises a pair of spaced apart movable members that engage the uppermost object and apply an axial pulling force to the uppermost object to separate the uppermost object from the next adjacent object, wherein the pair of spaced apart movable members comprises a pair of selectively operable discharge belts that define spaced apart facing engagement runs, wherein the guide means is operable to orient the objects such that the uppermost object is moved between the engagement runs of the pair of discharge belts.

36. The discharge system of claim 35, further comprising means for moving the pair of discharge belts between an open inoperative position for receiving the uppermost object therebetween during advancement of the objects, and a closed operative position in which the engagement runs of the pair of discharge belts are moved into engagement with the sides of the uppermost object.

37. The discharge system of claim 35, wherein the advancement means is operable to move the objects in a generally horizontal direction, and wherein the guide means comprises stationary guide wall structure configured to alter the direction of movement from the generally horizontal direction to a generally vertical direction at a transfer area at which the pair of discharge belts are located.

* * * * *